April 21, 1925.  1,534,180
G. KOMAREK
DRIER
Filed Feb. 7, 1921  10 Sheets-Sheet 4
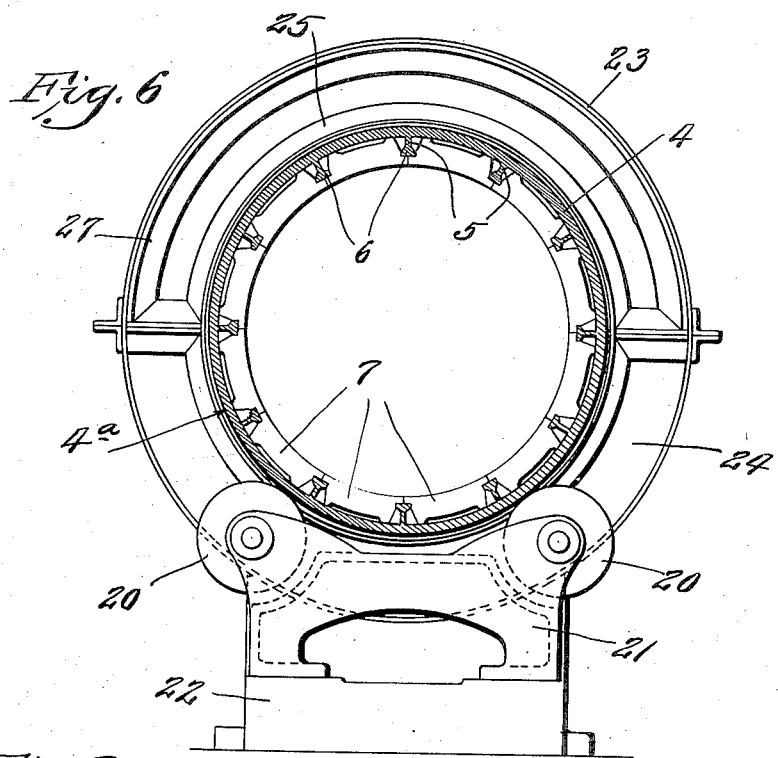
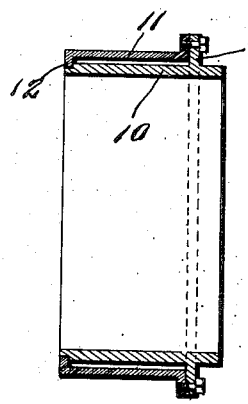
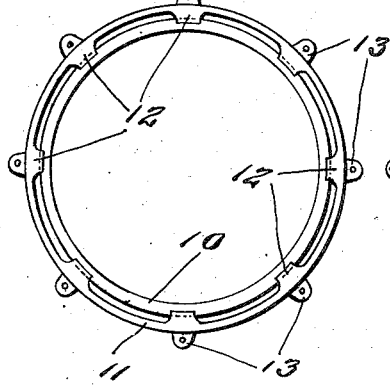
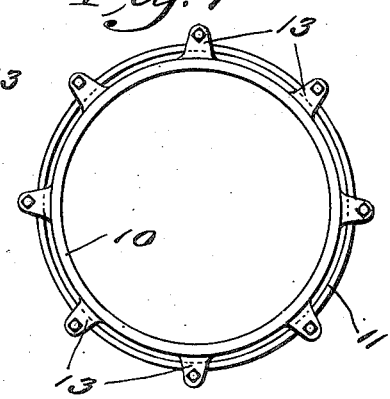
Inventor
Gustav Komarek
By _____ Atty.

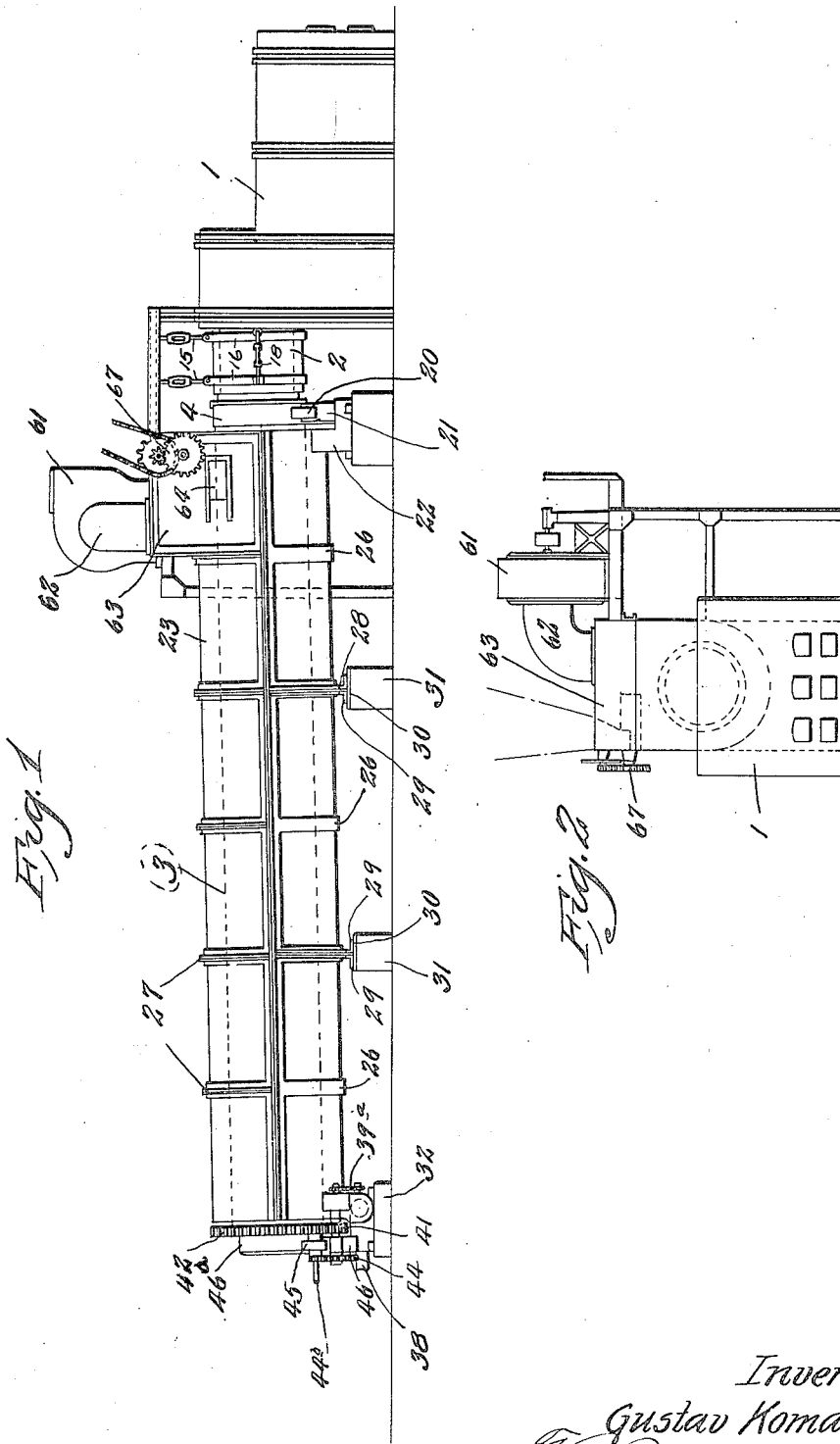

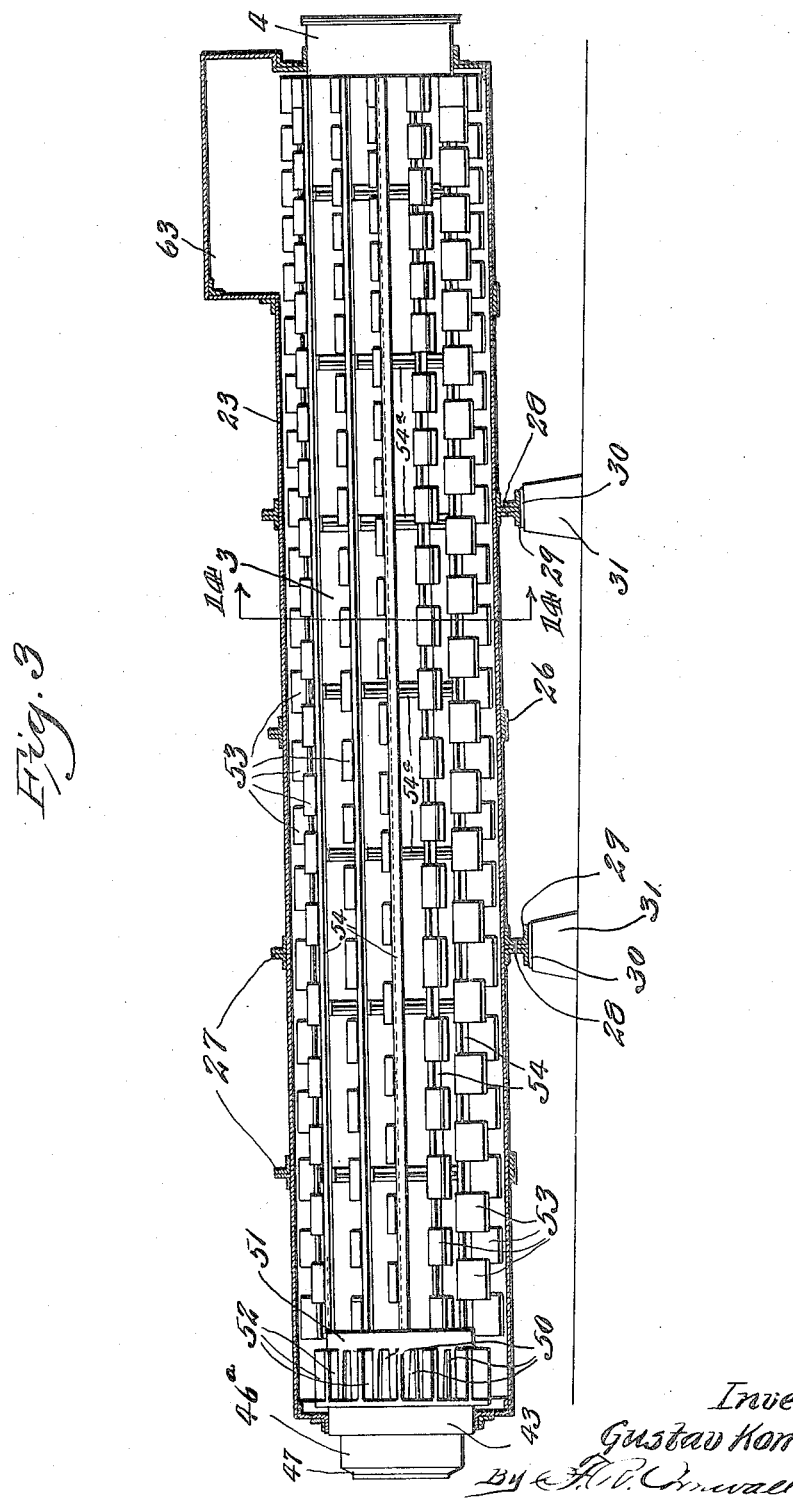

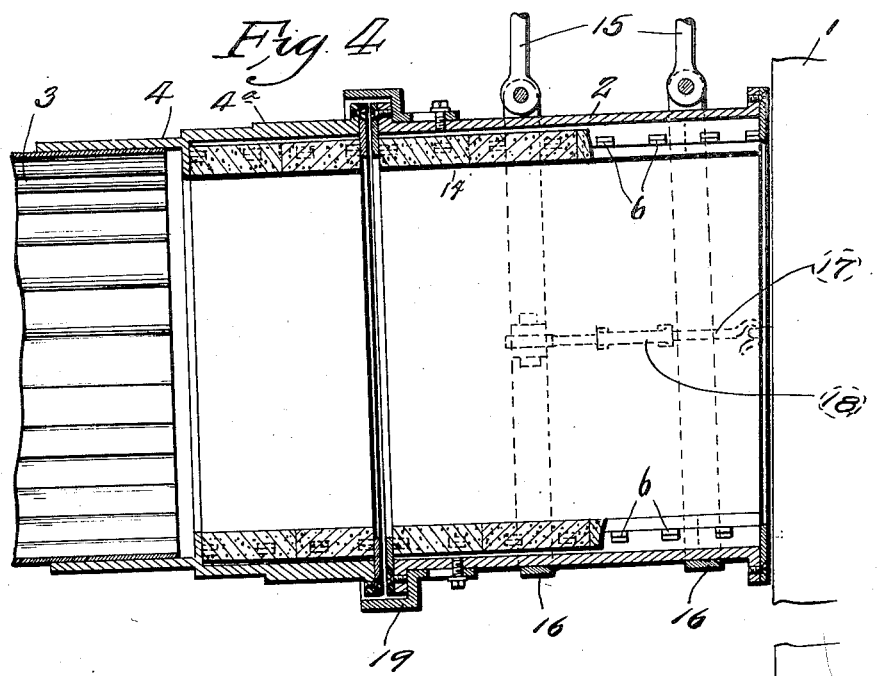
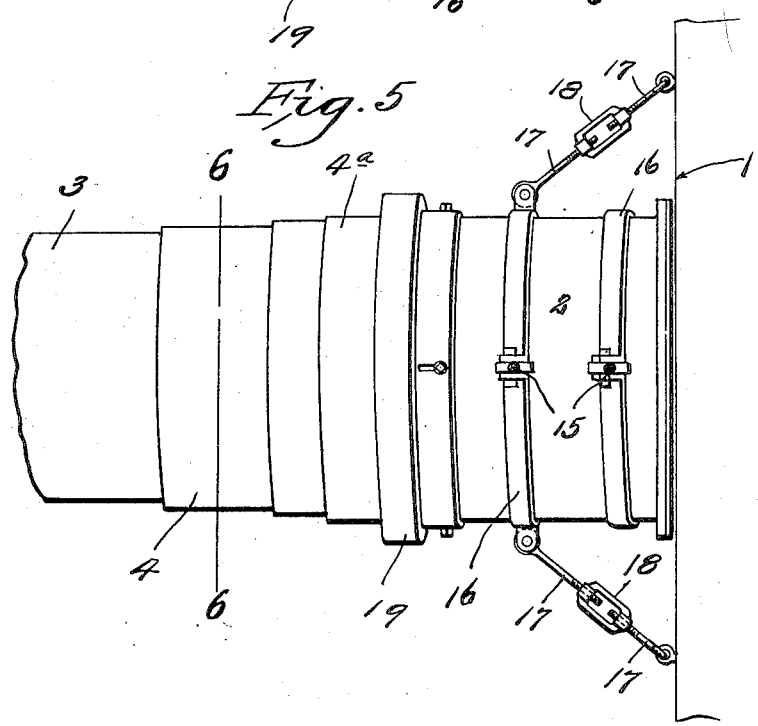

April 21, 1925.
G. KOMAREK
DRIER
Filed Feb. 7, 1921 10 Sheets-Sheet 5
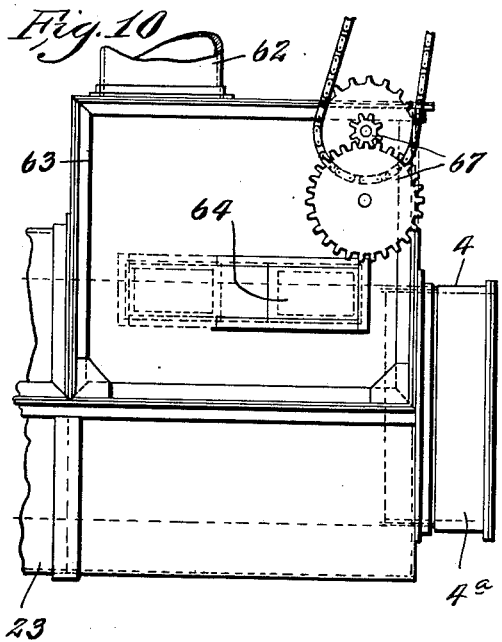
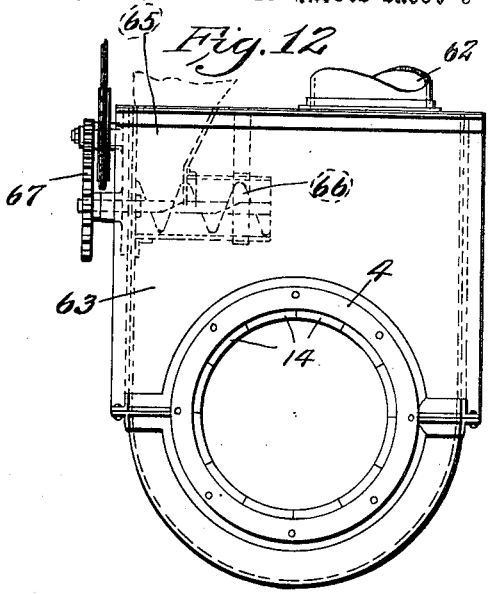
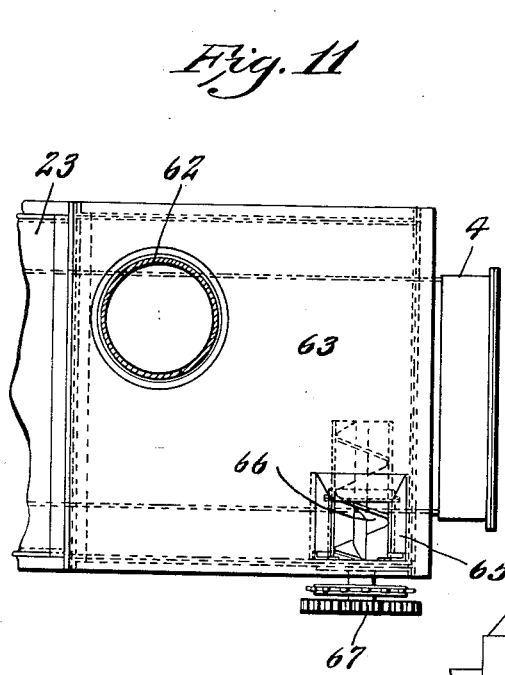
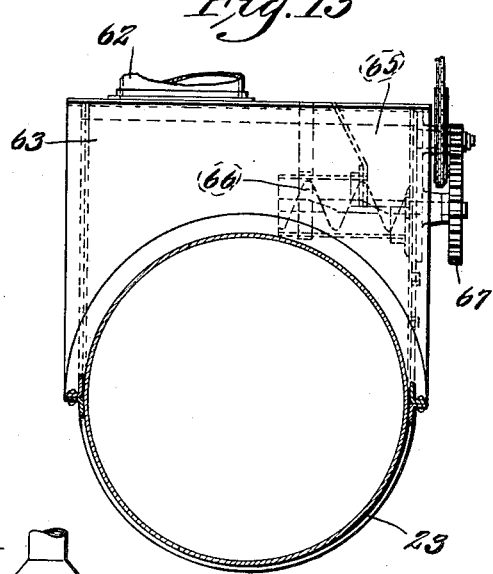
Inventor
Gustav Komarek April 21, 1925.

G. KOMAREK

DRIER

Filed Feb. 7, 1921   10 Sheets-Sheet 6

Inventor
Gustav Komarek

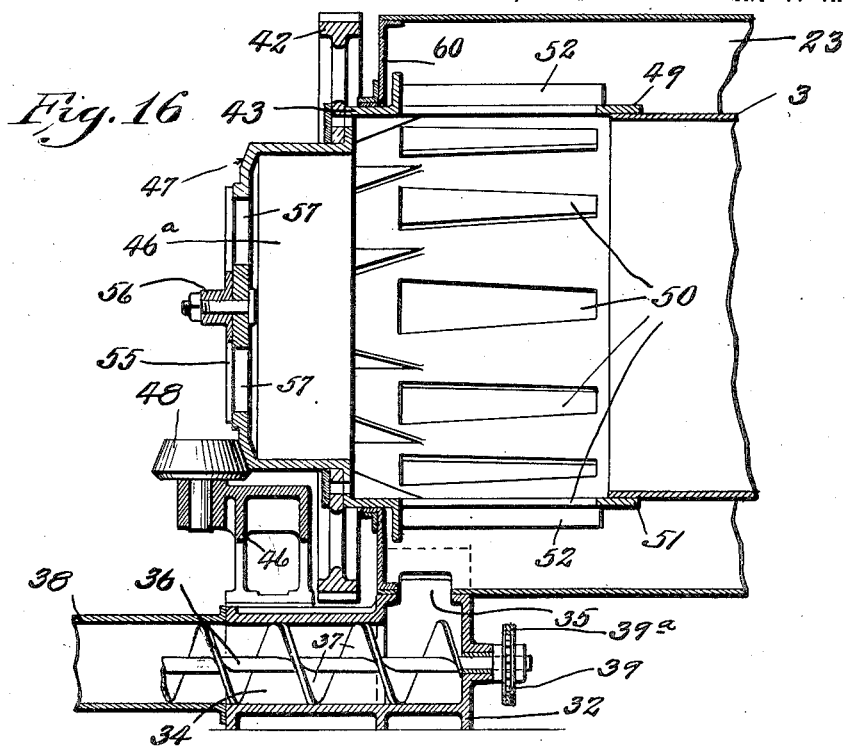
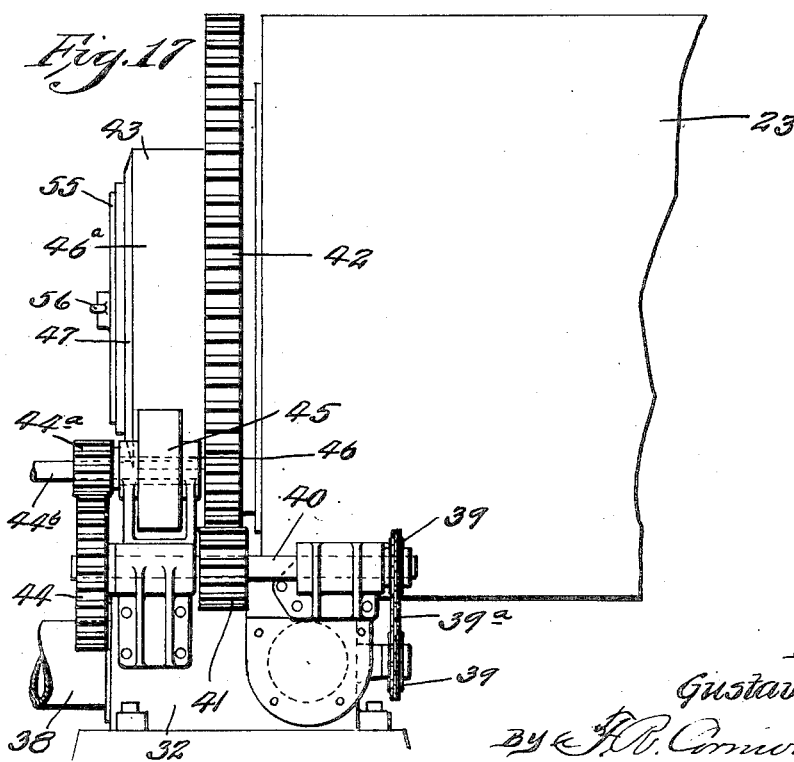

April 21, 1925. 1,534,180
G. KOMAREK
DRIER
Filed Feb. 7, 1921 10 Sheets-Sheet 8
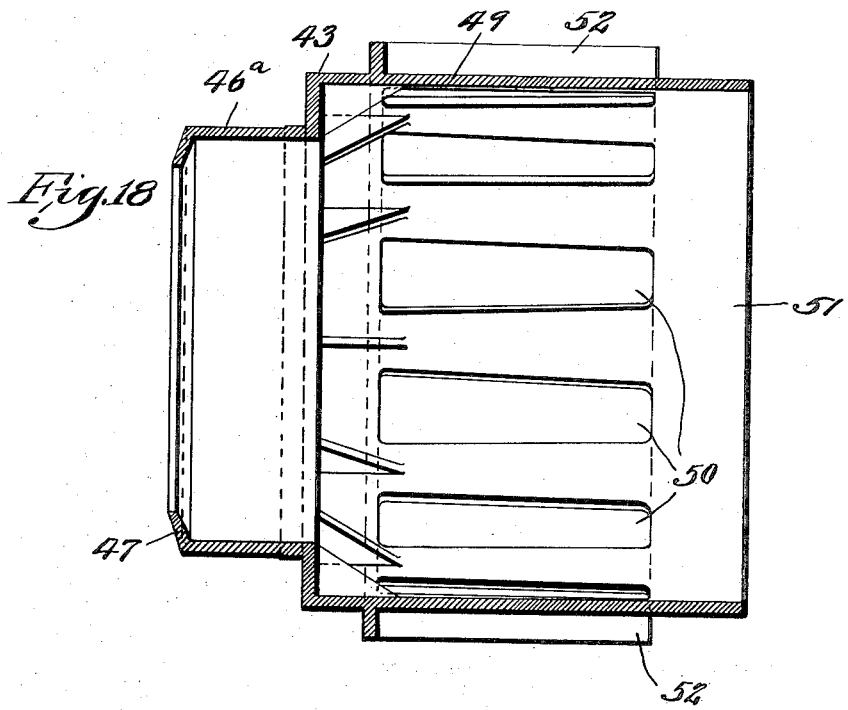
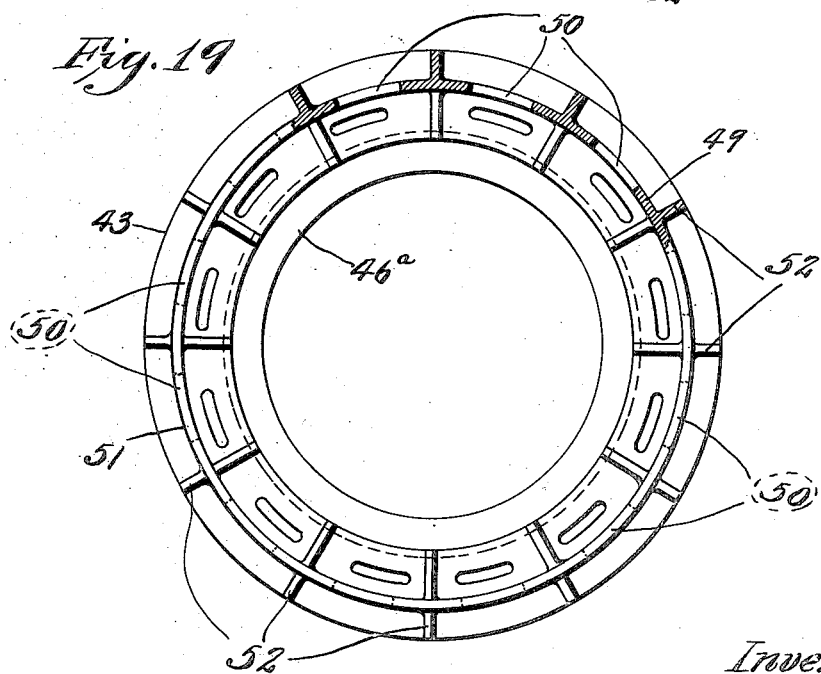
Inventor
Gustav Komarek
By F. P. Cornwall Atty.

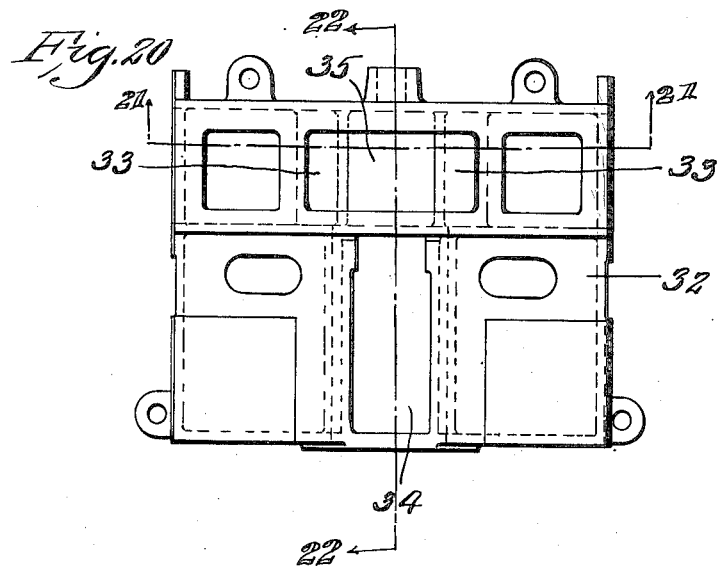
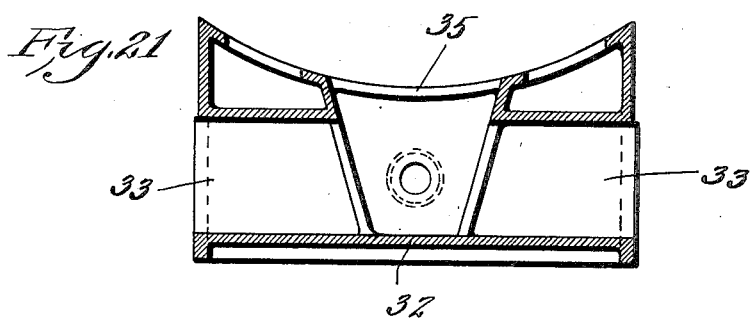
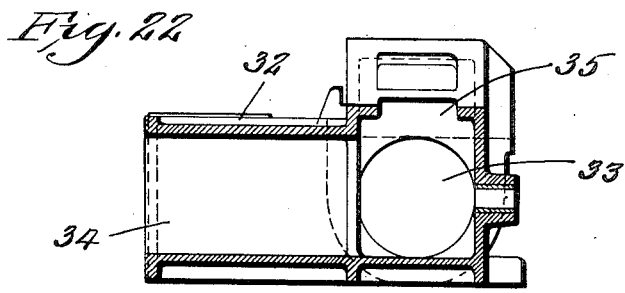

April 21, 1925.

G. KOMAREK

DRIER

Filed Feb. 7, 1921 10 Sheets-Sheet 10

1,534,180

Inventor
Gustav Komarek
By F. R. Cornwall Atty.

Patented Apr. 21, 1925.

1,534,180

UNITED STATES PATENT OFFICE.

GUSTAV KOMAREK, OF CHICAGO, ILLINOIS, ASSIGNOR, BY MESNE ASSIGNMENTS, TO MALCOLMSON ENGINEERING AND MACHINE CORPORATION, OF ST. LOUIS, MISSOURI, A CORPORATION OF MISSOURI.

DRIER.

Application filed February 7, 1921. Serial No. 442,976.

*To all whom it may concern:*

Be it known that I, GUSTAV KOMAREK, a citizen of the United States, residing at the city of Chicago, county of Cook, and State of Illinois, have invented a certain new and useful Improvement in Driers, of which the following is a full, clear, and exact description, such as will enable others skilled in the art to which it appertains to make and use the same, reference being had to the accompanying drawings, forming part of this specification, in which—

Figure 1 is a side elevational view of my improved drier.

Figure 2 is a front elevational view of the same.

Figure 3 is an enlarged side elevational view of the drying cylinder.

Figure 4 is a vertical sectional view through the front end of the cylinder and its connections.

Figure 5 is a top plan of the front end of the cylinder and its connections.

Figure 6 is a sectional view on line 6—6 of Figure 5.

Figure 7 is a cross-sectional view of a modified form of the front end of the revolving cylinder.

Figure 8 is an end elevational view of the inner end of the cylinder ring shown in Figure 7.

Figure 9 is an end elevational view of the inner lining ring.

Figure 10 is an enlarged side elevational view showing the expansion chamber at the front end of the revolving cylinder.

Figure 11 is a top plan view thereof.

Figure 12 is a front elevational view of the same.

Figure 13 is a rear elevational view.

Figure 13ª is a modified form of expansion chamber.

Figure 14:
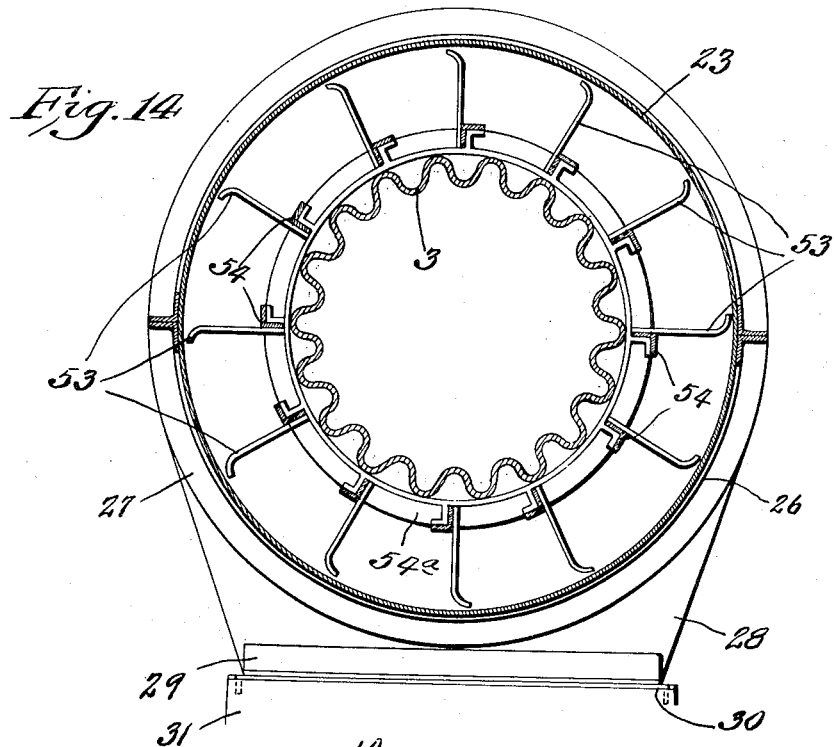

Figure 14 is a cross-sectional view on the line 14—14 of Figure 3.

Figure 15:
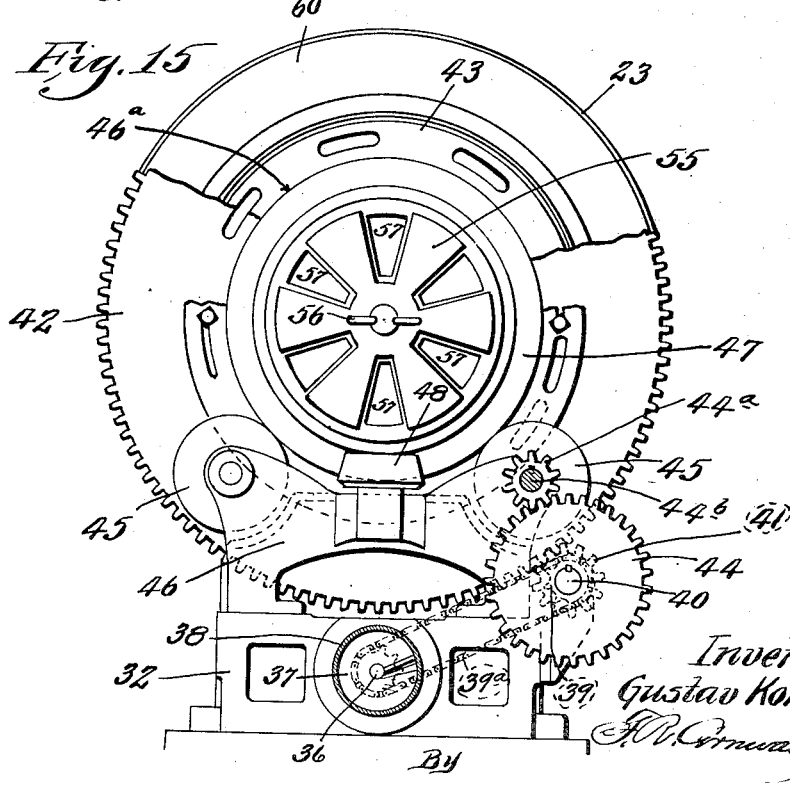

Figure 15 is a rear elevational view of the rotating cylinder.

Figure 16 is a vertical cross section taken longitudinally through the rear end of the rotating cylinder.

Figure 17 is a side elevational view, partly in section, of the rear end of the rotating cylinder.

Figure 18 is a vertical sectional view through the rear end of the rotating cylinder.

Figure 19 is a front elevational view of the part shown in Figure 18.

Figure 20 is a top plan view of the base casting at the rear of the cylinder.

Figure 21 is a sectional view on the line 21—21 of Figure 20.

Figure 22 is a sectional view on the line 22—22 of Figure 20.

Figure 23:
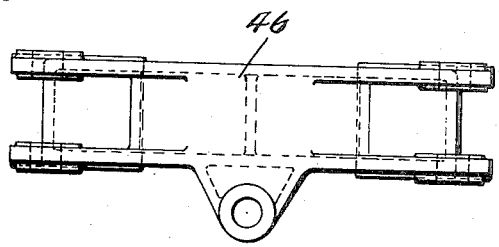

Figure 23 is a top plan view of the roller supporting casting at the rear end of the cylinder.

Figure 24:
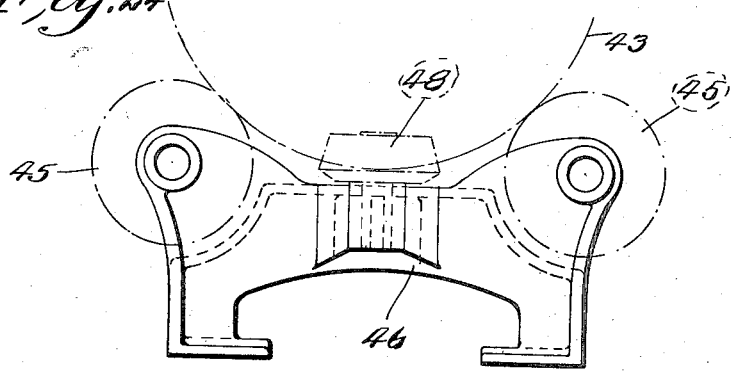

Figure 24 is a rear elevational view thereof.

Figure 25:
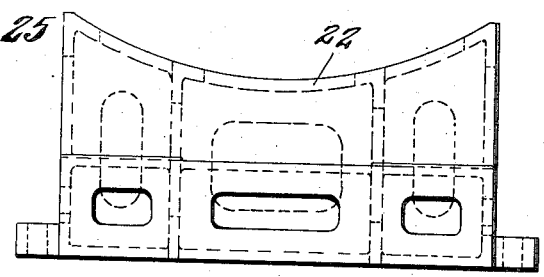

Figure 25 is a rear elevational view of the casting arranged at the front end of the cylinder.

Figure 26:
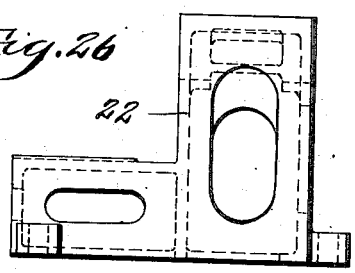

Figure 26 is a side elevational view of the same.

This invention relates to a new and useful improvement in driers designed especially for drying coal dust for briquetting purposes, foodstuffs, and other granular or pulverulent material, the object of my present invention being to simplify and cheapen the construction of driers of this character and to make them efficient, and of large capacity, requiring a comparatively small amount of power for their operation.

The drier shown in the accompanying drawings is designed particularly for drying coal dust for briquetting purposes, and in drying such material and other material where the products of combustion from the heating furnace can come in direct contact with the material being dried, I prefer to first pass said products of combustion through a rotating cylinder which carries lifting plates or paddles on its exterior for elevating and cascading the material to be dried over the surface of the rotating cylinder and returning said products of combustion between said rotating cylinder and a stationary cylinder and through and around the material which is being cascaded and dried so that these returning products of combustion will carry off the moisture from the point or points where it is most quickly developed, i. e., at the feed end. The intense evaporation of moisture does not commence until the temperature of 212° F. is attained. This, of course, takes into consideration the heat conducting qualities of the inner rotating cylinder and the specific heat of coal, which is 0.24; thus the material will have advanced about a third of the length of the drier before evaporation to any great extent takes place.

In the drawings, I have shown a furnace 1 of any ordinary or approved construction, said furnace consisting of the usual grate bars, ash-pit, combustion chamber, etc., the products of combustion being delivered to a suspended connection 2 (Fig. 5) arranged between the inner end of the furnace and the forward or feed end of the revolving cylinder. This revolving cylinder is preferably made of corrugated metal, the corrugations or flutes in which extend longitudinally, this cylinder being about forty feet long and about five feet in diameter.

This corrugated cylinder is indicated at 3 and its forward end is secured to a ring casting 4, which ring casting is provided on its inner face with radially disposed webs 5 having T-shaped lugs 6 whereby fire brick 7 may be introduced into the ring casting for the purpose of preventing the same from becoming too hot on account of the proximity of the furnace and the fact that the ring casting is not intended to receive any of the material to be dried and which would have a tendency to keep the ring cool. In some instances, where it is desired that the ring casting shall not be heated, I may employ a ring in the form of a casting 10 (see Figs. 7 to 9, inclusive) which is spaced from the ring casting 11 at its rear end by means of lugs 12, the ears 13 at the forward end of said lining ring tending to space, through the medium of the fastening bolts, said lining casting from the ring casting, the space being open at each end so as to admit of cool air being drawn into the forward end of the revolving cylinder and thus prevent such ring casting from becoming overheated.

The flue connection 2 from the furnace to the revolving cylinder is likewise lined with fire brick 14, and this flue connection is preferably suspended by links 15 from an overbeam and connected to bands 16. Rods 17 with turnbuckles 18 are arranged on each side of the flue connection for drawing the same up close to the furnace wall. These rods have hooks at one end for engagement with eyes in the bands so that the rods may be disengaged and the flue connection moved to one side for purposes of cleaning or inspecting the parts. The rear end of the flue connection is provided with a Z-shaped ring 19 which is designed to fit over the forward end of the ring casting 4 and be held in position by suitable securing means. This Z-shaped ring is slidable longitudinally so that it can be moved longitudinally when it is desired to laterally displace the flue connection. The front of the ring casting 4 is provided with a track surface 4ᵃ with which co-operate idle rollers 20 mounted in bearings in a casting 21, (see Fig. 6) which casting 21 is bolted or otherwise secured to a casting 22. As shown in Figure 25, this casting 22 is provided with a saddle portion which provides a seat for the cylindrical lower forward end of the stationary shell 23.

This stationary shell 23 is provided with a closing plate 24 having an angle 25 secured thereto adjacent to the ring casting 4. This stationary shell 23 is preferably made of boiler iron, the sections thereof being connected together by splicing plates 26 riveted to the stationary shell sections. At intervals, banding angles 27 are secured to the stationary shell, and on each side of the knee-webs 28 (see Figure 14), which webs have angles 29 on their lower edges, said angles resting upon plates 30 whose ends are embedded in concrete supports 31. This stationary shell is so supported that it is free to expand forwardly on its support and on the saddle casting 22; but as the stationary shell and revolving cylinder are slightly inclined, their rear ends being lower than their forward ends, means are provided for holding the stationary shell against longitudinal movement at its rear end. These means are best shown in Figures 20 and 21 wherein 32 indicates a rear base casting which is provided with laterally extending cylindrical chambers 33 and a rearwardly extending cylindrical chamber 34. 35 indicates an opening in the casting through which material is discharged from the stationary casing or housing at the point of intersection of the cylindrical chambers 33 and 34.

36 indicates a shaft having a spiral plate 37 (Fig. 16) forming a conveyor for forcing the material rearwardly through a pipe 38. It is obvious that this shaft 36 could be arranged in the transverse cylindrical member 33 so as to force the material laterally on either side into discharge pipes, not shown, secured to the base casting. Where cylindrical chamber 34 is used for a rearward discharge, as above described, closing plates and manholes may be used for closing the ends of the cylindrical chambers 33.

Shaft 36 is preferably driven by means of sprocket wheels 39 and sprocket chain 39ᵃ, one of which wheels is arranged on a shaft 40 and the other on shaft 36. A pinion 41 is fixed to shaft 40 and meshes with the main driving gear 42 arranged on the rear end casting 43. 44 indicates a gear wheel mounted on the shaft 40 and in mesh with a pinion 44ᵃ which is carried by shaft 44ᵇ driven by any suitable source of driving power.

45 indicates idle rollers mounted upon suitable trunnions in a casting 46 secured to the base casting 32. These idle rollers 45 support a track plate or extension 46ª of the rear end casting 43 (see Figure 18). 47 indicates a tapered track on the rear end casting which is designed to cooperate with a tapered idle roller 48 mounted in suitable bearings in the casting 46, this idle roller 48 forming an antifriction support or bearing for preventing rearward movement of the revolving cylinder of which the casting 43 forms a part. This casting 43 in addition to the track plate 46ª is provided with a ring member 49 having openings 50 therein, said ring extending inwardly as at 51 to provide an attaching flange to which the fluted or corrugated walls of the revolving cylinder are connected. The ring 49, in addition to the openings 50, is provided with a series of outwardly extending paddle blades 52, preferably arranged between the openings, whose function is to sweep material being dried into the opening in the stationary casing or housing which registers with the opening 35 in the casting 32, said material filling into the intersection of the cylindrical chambers 33 and 34 so that it can be discharged laterally or rearwardly by the conveyor screw 37 arranged in one or the other of said chambers.

The revolving chamber 3, before referred to, is preferably corrugated, and is provided with a series of lifting paddles or blades 53 secured to angles 54, which are carried by rings 54ª. Cylinder 3 is preferably made in sections and the intermediate ends of said sections are secured to rings 54ª so that cylinder 3 is reinforced by angles 54 and rings 54ª.

By referring to Figure 3, it will be seen that these plates or paddles 53 are arranged relatively close to each other and staggered at the forward end of the cylinder, this close arrangement extending approximately throughout the zone of the extension chamber hereinafter described, beyond or behind which said blades are spaced more widely apart until, as they approach the rear end of the revolving cylinder, the blades slightly overlap each other.

The purpose of grouping the paddles or blades 53 close together so that they will appreciably overlap each other at the front end of the drying cylinder is to lift and cascade the material to be dried and keep the same constantly agitated so that it can more readily be quickly and thoroughly dried out. Both the stationary casing and the rotating cylinder are slightly inclined, as shown in Figure 1, and as the material is successively lifted and cascaded, it will gradually work its way down toward the rear or discharge end of the drier. In this lifting and cascading operation, the longitudinally disposed corrugations serve an important part. First, they reinforce and stiffen the rotating cylinder; second, they increase the radiating surface of the rotating cylinder about seventy-five per cent; and, third, the corrugations form recesses or pockets into which the material to be dried out is caught and held for an appreciable length of time and thereby subjected to the direct heating action of the rotating cylinder.

As hereinbefore stated, in the designs shown in Figure 1, the rotating cylinder is about five feet in diameter and about forty feet long, the anti-friction supports therefor being in the form of idle rollers located at each end and co-operating with the track rings, heretofore described. While I prefer to use a corrugated cylinder, as above described, said cylinder may be plain, or corrugated as indicated in Figure 14, and such a cylinder might be advantageously employed in shorter lengths or where the points of support for the cylinder are more closely arranged. In practice, I have found that in drying some coals, such as Pennsylvania anthracite, it is advisable to heat the same so that it emerges from the drier at about two hundred (200°) degrees F., whereas in drying out bituminous coal such as found in Illinois, a lower temperature seems to be effective, that is, the emerging dry coal may be about one hundred fifty degrees F.

The capacity of the drier shown in Figure 1 is about fifty tons of coal per hour, and the revolving cylinder is geared to make about nine revolutions per minute so that the time required for coal to pass through the drier is about twenty-five minutes. The products of combustion passing through the flue connection into the rotating cylinder possess a heat of about two thousand degrees F. at the time they enter the cylinder, but this heat is quickly conducted through the walls of the cylinder so that when the products of combustion reach the rear end of the cylinder and pass through the openings 50 into the space between the rotating cylinder and the stationary shell, these products of combustion, or spent gases, possess a heat of about four hundred degrees F. An exhaust fan is located at the forward end of the shell or housing for drawing the products of combustion around and through the material to be dried in the space between the rotating cylinder and the stationary shell. However, before describing this forced draft, I will state that I prefer to arrange a damper or valve 55 on the rear end of the revolving cylinder (see Figure 15) which has a hand-operable nut 56 whereby said damper plate may be locked in rotatably adjustable position to cover or expose openings 57 in the end wall of the end casting 43. In this way the temperature of the products of combustion in the air drawn forwardly between the rotating cylinder and stationary shell may be regulated.

I prefer to employ an exhaust fan for drawing air, or air and products of combustion through the space between the rotating cylinder and the stationary shell in which the material is being dried. For convenience, I prefer to locate this exhaust fan in a suitable framework arranged at the front end of the stationary shell, the casing of said fan being indicated at 61, and said exhaust fan being connected by an elbow 62 at the top of an expansion chamber 63. This expansion chamber is preferably provided with an observation opening, or openings, in its side wall and which opening is closed by a cover plate 64. As shown in Figure 13ª, I may increase the size of the expansion chamber 63 by adding a pyramidal extension thereon, as indicated at 63ª. 65 indicates a feed hopper having a lateral discharge spout in which operates a feed screw 66 driven by suitable gearing 67. This feed spout terminates above the forward end of the rotating cylinder so that the material to be dried will be delivered on top of said cylinder and carried around the cylinder by the lifting blades.

In operation, a fire is started in the furnace, the exhaust fan, feeder, drier cylinder, and discharge device are put in motion. Material to be dried is fed into the drier, and the hot gases pass from the furnace to the rotating cylinder, then through the communicating openings at the rear end of said cylinder into the annular space between the rotating cylinder and the stationary housing, then toward the front, and into the expansion chamber, whence they are expelled into the atmosphere by an exhaust fan. The material to be dried is fed onto the rotating cylinder and is carried around with the rotating cylinder by the lifting paddles. In this action, the material absorbs heat from the hot inner cylinder until its temperature is sufficiently high to cause evaporation of the moisture contained therein. The lifting paddles are so shaped that they will hold the material against the hot inner cylinder for a maximum length of time, and also cascade it from certain positions. To accomplish this, the lifting paddles are not of great width, hence a maximum amount of spilling may be secured from the ends of the lifting paddles, such spilled material falling partly upon the hot cylinder and partly upon the adjoining lifting paddles which are so spaced that the material, which they receive through spilling, will fall onto the central portion thereof. By this arrangement, a maximum amount of intermixing between the more or less heated particles of coal will be obtained. The spacing of the lifting paddles is such that the amount of spilling or cascading increases as the material nears the discharge end of the drier, for the following reasons: The material to be dried is usually wet when fed into the drier, and, ordinarily, will not respond readily to any cascading action, nor will such action be useful at or in proximity to the point where the wet and cold materials are fed into the drier. It is intended to hold the wet material against the hot cylinder for a maximum length of time so as to bring it up to a temperature at which evaporation of its moisture will commence, this temperature being 212° F.

Another reason why an intense cascading of material is not desired at or near the feed end is that the returning gases have already spent most of their heat and have absorbed all or nearly all of the moisture they are able to hold or carry; in other words, they are saturated to near the dewpoint. This condition changes as the material gradually travels toward the rear or discharge end. The moisture having been gradually evaporated from the material, it will flow or spill more readily, and furthermore, the heat of the returning gases increases as the material moves rearwardly, when it becomes desirable to cause the material to be spilled or cascaded from the lifting blades or scoops with greater celerity so that the hot gases can pass through such spilled material. The scoop form of lifting blades is also instrumental in carrying the gases around with them and through the cascading material. This, however, will occur only where the density of the gases is great, due to their high temperature, but will not occur to any marked degree where the gases have contracted due to their loss of heat and absorption of moisture, which occurs as the gases pass forward or toward the feed end of the drier.

The action of the lifting blades or scoops carrying the gases partly around with them in the direction of travel of the heated cylinder will result in the moisture being absorbed more readily by the hot gases. The material to be dried advances gradually toward the rear or discharge end of the drier while being continually subjected to above-described action. When the point is reached where the gases pass through the opening from the rotating cylinder into the annular space therebetween and the fixed housing, certain additional advantages may be obtained by virtue of the construction of the rear end ring casting of the drier, that is, the material may be lifted by the scoops nearly to the top of the rotating cylinder and spilled through the communicating openings of the rotating cylinder, whence such material would again escape to the annular space through the bottom openings. Where material must be delivered hot, such action would result in much benefit, as the material is thus brought in direct contact with the gases as and before they pass through the openings into the annular space.

The adjustable openings at the rear end of the rotatable cylinder which establish communication with the outside atmosphere can be adjusted to allow ingress of fresh air to join and mix with the hot gases and material. Such fresh air will intermix with the hot gases before and as the same pass through the openings and into the annular space. By proper manipulation, the admission of fresh air may be made to determine any desired discharge temperature of the dried material.

From a standpoint of the highest drying efficiency, the drier should be operated without the admission of any fresh air, and in this drier the designs and proportions are intended to be such that a large percentage of moisture can be evaporated and carried off without the admision of fresh air. The limitations of the drying capacity will be established by the moisture carrying capacity of the returning gas which is known as the dewpoint.

The returning gases are drawn into an expansion chamber and expelled into the open by an exhaust fan. The expansion chamber is provided to allow the gases to expand and check their speed before expulsion. This allows a large amount of dust and small particles of material which are carried with the speeding gases, to settle and fall back into the drier instead of being allowed to rush through the exhaust fan. The location of this expansion chamber is of prime importance from an efficiency standpoint, and should be at a point where the limit of moisture carrying capacity of gases is reached; this point being rearward of the point where the cold and wet material is fed into the drier. Two actions would occur if the gases were allowed to go all the way to the front before their expulsion: 1st, the gases would become chilled when coming in contact with the cold material which is being fed into the drier; this chilling action would be responsible for a condensation and redeposit of some of the moisture upon the incoming material; and, 2nd, the rotatable cylinder is hottest at the point where material to be dried is fed into the drier; and as it is impossible to cover the hot end of the rotatable cylinder with cold and wet material over the whole circumference, some of the heat conducted through the uncovered portions of the cylinder will escape to the annular space; and if the wet gases were allowed to pass to the very front of the drier, a considerable amount of such heat would be absorbed by them and expelled into the open by the exhaust fan without performing useful work; but by locating the expansion chamber and point of expulsion a slight distance to the rear of the point of introduction of the material to be dried, such losses will be greatly minimized.

The loss of heat through the stationary housing is also a considerable factor, but this housing being stationary, it can be readily covered with non-heat conducting material.

As the rotating cylinder and stationary shell are subject to expansion and contraction, they are permitted to have independent longitudinal movement, the rotating cylinder being held against backward movement by the engagement between the idle abutment roller 48 and the tapered track on the rear end ring casting of the rotating cylinder; and the stationary shell is held against backward movement by two lugs 68 on the rear base casting 32 (see Figure 22).

I claim:

1. In a drier, the combination of a furnace, a stationary housing, a rotatable cylinder mounted in said housing and provided with exteriorly disposed paddles, a gas passage leading from said furnace to said cylinder, and an expansion chamber arranged above and in communication with one end of the annular chamber formed by said housing and said cylinder.

2. The combination of a furnace, a rotatable drying cylinder, and a flue connection between said furnace and cylinder, the same comprising suspension means, and members adjustably holding and clamping said connection to said furnace.

3. The combination of a furnace, a rotatable drying cylinder, and a displaceable flue connection between said furnace and cylinder, the same comprising suspension means and turn-buckle rods for holding and clamping said connection to said furnace.

4. In a drier, a stationary shell, a cylinder rotatably mounted therein, a gas passage leading to said cylinder, an expansion chamber above one end of said cylinder, and means for feeding material to be dried through said chamber onto said cylinder.

5. The combination of a furnace, a rotatable drying cylinder, a stationary and removable flue connection between said furnace and drying cylinder, and a slip ring mounted on said stationary flue connection for the purpose of covering the gaps between the rotatable drying cylinder and flue connection.

6. The combination of a furnace, a rotatable cylinder, a stationary housing surrounding said cylinder, a track ring connected to said cylinder, a flue connection between said furnace and said track ring, and a non-heat conducting material in said flue connection and track ring.

7. The combination of a rotatable track ring, a heat-carrying cylinder connected thereto, a stationary housing surrounding said cylinder, bearing rollers for supporting said track ring and cylinder, and means for supporting a fire brick lining in said track ring against collapse.

8. The combination of a rotatable track ring, a heat-carrying cylinder connected thereto, rollers for supporting said track ring and heat-carrying cylinder, and radially disposed ribs provided with lugs arranged on the inside of said track ring for supporting a fire brick lining.

9. The combination of a rotary track ring, a cylinder connected thereto, a stationarily mounted flue connection, and a slip-ring for spanning the space between said flue connection and said track ring.

10. The combination of a rotatable track ring, a cylinder connected thereto, a stationary housing surrounding said cylinder, rollers for supporting said track ring, and a non-heat conducting lining in said ring.

11. The combination of a rotatable track ring, a cylinder connected thereto, a stationary housing surrounding said cylinder, rollers for supporting said track ring, and means in said track ring for supporting fire-brick.

12. The combination of a rotatable track ring, a cylinder connected thereto, rollers for supporting said track ring, and radially disposed ribs provided with lugs for supporting a fire-brick lining in said track ring.

13. The combination of a stationary housing, a rotatable cylinder mounted therein, a track ring secured to each end of said rotatable cylinder, said track rings protruding through said stationary housing to the exterior at each end, and a non-heat conducting lining in the forward track ring, said lining reaching partly into the interior of the stationary housing, and to a point where the cold material, which is being fed into the drier, falls onto the rotatable cylinder.

14. The combination of a stationary housing, a rotatable cylinder with track rings secured to each end, driving means attached to one of said track rings, said cylinder having longitudinally disposed openings located in its rear end, said openings being within the stationary housing to establish communication between the inside of said rotating cylinder and the annular space between said rotating cylinder and said stationary housing.

15. The combination of a stationary housing, a rotatable cylinder having a number of longitudinally disposed openings at its rear end, said openings being located in that part of the rotating cylinder which forms a track ring, lifting scoops or paddles fastened on the cylinder between the longitudinally disposed openings, and adjustable means at the rear end of the rear track ring for establishing communication with the exterior, and regulating the admission of air drawn into the interior.

16. The combination of a stationary housing, a rotatable inner cylinder protruding through both ends of said stationary housing, driving means on said rotatable cylinder for imparting rotary motion thereto, and means at the end of said rotating cylinder for holding the same against longitudinal movement toward the rear, but allowing free expansive movement in a forward direction.

17. The combination of a stationary shell or housing, a rotatable cylinder mounted therein, an expansion chamber above one end of said cylinder, and feeding mechanism for supplying material to be dried through said expansion chamber and onto said rotatable cylinder.

18. The combination of a stationary housing, a rotatable cylinder mounted therein, and an expansion chamber formed at the front end of said stationary housing, said expansion chamber extending across the full width of the stationary housing and a substantial distance towards the rear thereof.

19. The combination of a stationary housing, a rotatable cylinder mounted therein, an expansion chamber formed at the feed end of the housing, feeding arrangements for uniformly and continuously feeding the material to be dried onto the rotating cylinder, said chamber having an opening communicating with an exhaust fan, said opening being located at a point to the rear of the point where the material to be dried is introduced.

20. The combination of a stationary shell or housing, a rotatable and heated cylinder mounted therein, an expansion chamber formed at the feed end of said housing, said expansion chamber reaching from the horizontal center line of said stationary shell to a point above, to increase the area of its cross section, a feeding arrangement located near the extreme forward end of said expansion chamber, and an exhaust fan connected to a pipe leading from said expansion chamber.

21. The combination of a stationary shell or housing, a cylinder mounted for rotation therein, and longitudinally-extending transversely-overlapping blades on said cylinder, the said blades being spaced longitudinally different distances apart to efficiently agitate and dry the material contained in said housing.

22. The combination of a stationary shell or housing, a cylinder mounted for rotation therein, and blades arranged in longitudinal alinement on said cylinder, said blades being spaced apart, and the blades in adjacent lines being staggered.

23. The combination of a stationary shell or housing, a cylinder mounted for rotation therein, and a plurality of rows of alined blades arranged on said cylinder there being varying spaces between the blades of each line whereby the material in said housing is thoroughly mixed and cascaded over said cylinder.

24. The combination of a stationary shell or housing, a cylinder mounted for rotation therein, and alined blades arranged on said cylinder and in staggered relation to each other whereby the material in said housing is thoroughly mixed and cascaded over said cylinder.

25. The combination of a stationary shell or housing, a corrugated cylinder mounted for rotation therein, and plates mounted on the crowns of the corrugations of said cylinder for agitating the material contained in said housing.

26. The combination of a stationary shell or housing, a corrugated cylinder mounted for rotation therein, and plates mounted on the crowns of the corrugations of said cylinder there being varying distances between the plates on each crown whereby the material contained in said housing is agitated and progressively moved therethrough.

27. The combination of a stationary shell or housing, a corrugated cylinder mounted for rotation therein, plates mounted on the crowns of said corrugations, said plates being in staggered relation to each other and those on the same crown being spaced various distances apart whereby the material contained in said housing is agitated and progressively moved therethrough.

28. The combination of a stationary shell or housing, a cylinder mounted for rotation therein, plates mounted on said cylinder and in staggered relation to each other, the plates at the forward end of the cylinder being more closely arranged to each other than those at the rear end of the cylinder.

29. The combination with a stationary shell or housing, a cylinder mounted for rotation therein and having openings in its rear end, and blades mounted on said cylinder and in staggered relation to each other, said cylinder communicating with the housing through said openings.

30. The combination with a stationary shell or housing, a cylinder mounted for rotation therein, an exhaust pipe leading from the forward end of said housing, a heat generating medium located at the forward end of the cylinder and delivering its products of combustion into said cylinder, said cylinder having openings at its rear end through which said products of combustion pass into the rear end of the shell or housing.

31. The combination of a stationary shell or housing, a cylinder mounted for rotation therein, feeding mechanism for delivering material to be dried into the forward end of the shell or housing, means for rotating said cylinder in the housing, lifting blades on said cylinder, an exhaust pipe leading from the forward end of the housing, said cylinder having openings in its rear end for establishing communication with the annular space between the interior of the cylinder and the housing, the end of said cylinder being also provided with other openings, and means for regulating the size of the latter mentioned openings.

32. The combination with a stationary housing, a heated carrying cylinder mounted for rotation therein, paddles or lifting scoops mounted thereon which are spaced from each other and staggered in a transverse direction for the purpose of causing an overlap between the alternate rows, and a gap between other rows which are in longitudinal alinement, said gaps increasing in width towards the rear end of said carrying cylinder.

33. The combination of a stationary housing, a heat carrying cylinder mounted for rotation therein, paddles or lifting scoops mounted thereon and which are shaped or formed to hold the material against the heated cylinder causing a maximum amount of cascading action of the material and exerting force against the heated gases to cause them to move with and in the same direction as the paddles or scoops for the purpose of conveying the heated gases through the cascading material and carry off the moisture as it is emitted from same.

34. The combination of a stationary housing, a heat carrying cylinder mounted for rotation therein, paddles or lifting scoops fastened to said cylinder, the working surfaces of the paddles or scoops being in substantially longitudinal alinement with said rotatable cylinder but spaced from each other to overlap each other and form gaps between the various rows, the width of said gaps being so arranged that a maximum amount of cascading action is obtained at a point where the material is partly dried, and the minimum amount of cascading is obtained where the material is wet and soggy as at the front or feed end of the drier, and means for discharging the dried material at the rear end of the drier.

35. The combination of a stationary housing, a heat carrying cylinder mounted for rotation therein, and blades or scoops mounted on said cylinder for the purpose of lifting and cascading the material in varying degrees, the greater degree being at a point where the material has become partly dried and the lesser degree at a point where the material is wet or undried.

36. A rear end track ring for cylinder of the character described, the same being provided with means for the attachment of the cylinder and having openings in its side and end walls, means for regulating the size of the openings in the end walls, and blades on the exterior periphery of the track ring and between the lateral openings thereof.

37. In a drier, a track ring of the character described having a circumferential track portion and a beveled track portion, and idle rollers for co-operating with said track portions to maintain the position of the latter.

38. The combination of a rear end track ring having track portions angularly disposed to each other, a gear mounted on said track ring, idle rollers co-operating with said track ring, and radially disposed blades on the inner end of said ring.

39. The combination of a stationary housing, a cylinder mounted for rotation therein, feeding mechanism for delivering material to be dried into the forward end of the stationary housing, means for rotating said cylinder within the housing, lifting blades or scoops on said cylinder, said cylinder having openings at the rear end of the cylinder for establishing communication with the annular space between the stationary housing and the rotatable cylinder, and having other adjustable openings at its end outside of the stationary housing for establishing communication with the exterior for the purpose of admitting additional air.

40. The combination of a stationary housing, a rotatable cylinder mounted for rotation therein, lifting blades or scoops fastened to said cylinder for cascading the material, said cylinder being provided with openings at its rear end to establish communication with the annular space between said stationary housing and said rotatable cylinder, and openings in the end of said rotatable cylinder located outside of the inclosure of said stationary housing, said last mentioned openings communicating with the atmosphere, means for regulating said openings, and means for mixing any air received through said opening with the hot gases and passing them combined through the openings in said rotating cylinder which form communication with said annular space, an exhaust fan for drawing said gases through the cascaded material in the annular space and into an expansion chamber and discharging them into the atmosphere, said expansion chamber and point of exhaustion being located at a point to the rear of where material to be dried is fed into the drier for the purpose of preventing redeposit of moisture.

41. The combination of a heated furnace, a stationary housing, a rotatable cylinder inside of said housing and protruding through said stationary housing at its front and rear ends, means on the exterior of said cylinder for cascading the material within the housing, means for passing the products of combustion in a rearward direction through said rotatable cylinder, means for diluting said gases with air from the exterior and mixing both before they pass into the annular space between said housing and said cylinder, means for passing the hot gases through the cascaded material for the purpose of absorbing the moisture from the material, means for expelling said gases before the dewpoint is reached to prevent a redeposit of the moisture on the incoming material to be dried, and means for checking the speed of the gases in an expansion chamber located at the forward end of the housing so as to allow particles of dust and material carried by said gases to fall back into the drier.

42. The combination of a furnace, a stationary housing, a rotatable cylinder mounted therein, heating means passing from said furnace through said rotatable cylinder, communicating means between free atmosphere and said rotatable cylinder, said communicating means being adjustable and so arranged that said communication with the exterior can be reduced whenever operating conditions demand, communicating means between said rotatable cylinder and said stationary housing for the purpose of passing the gases into the space therebetween, means whereby said gases can be removed from said stationary housing, said means consisting of an expansion chamber into which the gases are first drawn, and means for expelling the gases from said expansion chamber, said means operating at a point to the rear of the incoming material and at a distance therefrom necessary for the gases to absorb the moisture from the material and before the dewpoint of the gases is reached.

43. The combination of a stationary shell or housing, a hollow casting for supporting the rear end thereof, the intersecting chambers of said casting communicating with the interior of said shell or housing, and means arranged in one of said chambers for discharging material from the casting.

44. The combination of a stationary shell or housing, a cylinder mounted for rotation therein, a hollow casting for supporting the rear end of said shell or housing and said cylinder, abutment means on said casting for preventing backward movement of said shell and cylinder, and discharging means arranged within said casting.

45. A rear end casting for apparatus of the character described, the same being provided with intersecting chambers for enclosing discharging means, which discharging means may be arranged at different angles in said chambers, respectively, whereby material may be discharged from a selected opening in the side wall of the casting.

46. A rear end casting for apparatus of the character described comprising journal bearings and provided with intersecting chambers whose axes are angularly disposed to each other, in combination with discharging means located in a selected chamber, whereby the material may be discharged through an opening located at a selected side of the casting.

47. In a rear end construction for apparatus of the character described, comprising horizontal bearings for idle rollers, and an abutment roller, said abutment roller having a face inclined from the vertical in combination with a track ring having a circumferential track co-operating with said idle rollers, and a track inclined from the vertical for co-operating with said abutment roller.

48. The combination of a heat supplying furnace, a rotatable cylinder connected thereto, track rings fastened to each end of said rotatable cylinder, bearing rolls for supporting said rotatable cylinder, a tapered abutment roller co-operating with an inclined abutment track for the purpose of preventing longitudinal movement of said cylinder toward the rear, a driving gear attached to said track ring, a stationary housing surrounding the rotatable cylinder, the ends of said rotatable cylinder and track ring protruding through said stationary housing, communicating means between said rotatable cylinder and said surrounding stationary housing for the purpose of providing gas or hot air passages, and means for collecting and expanding said gases prior to their expulsion, said means consisting of an expansion chamber having a tapered hood, said chamber being located at a point where the gases have reached their maximum capacity for carrying and holding moisture.

49. The combination of a shell or housing having a feed opening at its forward end, and openings in its rear end for admitting air, means for controlling said last mentioned openings, and a cylinder mounted for rotation in said housing, the end of said cylinder being provided with openings for admitting air, and means for regulating said last mentioned openings.

50. The combination of a stationary shell or housing, a cylinder mounted for rotation therein, a heat generating means at the forward end of said rotating cylinder, there being openings at or near the rear end of said rotating cylinder for establishing communication between the cylinder and the shell or housing, an exhaust pipe leading from the forward end of said shell or housing, and a fan connected to said exhaust pipe for drawing the heated gases rearwardly through the cylinder and forwardly around the cylinder.

51. The combination of a cylinder having rings surrounding the same, angles secured to said rings, and paddle blades secured to said angles.

52. The combination of a corrugated cylinder, rings surrounding the same and providing means of attachment for angle bars, angle bars secured to said rings and extending longitudinally of the cylinder, and paddle blades secured to said angle bars.

53. The combination of a shell or housing having a feed opening at its forward end, and openings in its rear end for admitting air, means for controlling said last mentioned openings, and a cylinder mounted for rotation in said housing, the end of said cylinder being provided with openings for admitting air, and means for regulating said last mentioned openings.

In testimony whereof I hereunto affix my signature this 31st day of January, 1921.

GUSTAV KOMAREK.